(12) United States Patent
Shi et al.

(10) Patent No.: US 11,243,565 B2
(45) Date of Patent: Feb. 8, 2022

(54) DATA PROCESSING METHOD, DEVICE, AND ELECTRONIC APPARATUS

(71) Applicant: Lenovo (Beijing) Co., Ltd., Beijing (CN)

(72) Inventors: Wenbo Shi, Beijing (CN); Ping Tian, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/945,410

(22) Filed: Jul. 31, 2020

(65) Prior Publication Data

US 2021/0034103 A1 Feb. 4, 2021

(30) Foreign Application Priority Data

Jul. 31, 2019 (CN) .......................... 201910701492.X (51) Int. Cl.
*G06F 1/16* (2006.01)

(52) U.S. Cl.
CPC ............ *G06F 1/1616* (2013.01); *G06F 1/165* (2013.01); *G06F 1/1649* (2013.01); *G06F 1/1681* (2013.01)

(58) Field of Classification Search
CPC .... G06F 1/1615; G06F 1/1616; G06F 1/1618; G06F 1/1675; G06F 1/1649; G06F 1/1622; G06F 1/1647; G06F 1/166; F16M 11/06; F16M 11/123; F16M 11/14; F16M 13/005
See application file for complete search history.

(56) References Cited

U.S. PATENT DOCUMENTS

| | | | | |
|---|---|---|---|---|
| 5,278,779 A | * | 1/1994 | Conway | G06F 1/1616 341/20 |
| 6,302,612 B1 | * | 10/2001 | Fowler | F16C 11/06 16/224 |
| 6,522,529 B1 | * | 2/2003 | Huilgol | G06F 1/1616 248/919 |
| 6,658,272 B1 | * | 12/2003 | Lenchik | G06F 1/1683 455/575.1 |
| 7,835,145 B2 | * | 11/2010 | Chiang | G06F 1/1616 361/679.27 |
| 8,054,615 B2 | * | 11/2011 | Lin | G06F 1/1616 361/679.07 |

(Continued)

FOREIGN PATENT DOCUMENTS

| CN | 1411573 A | 4/2003 |
|---|---|---|
| CN | 2752838 Y | 1/2006 |

(Continued)

*Primary Examiner* — Anthony Q Edwards
(74) *Attorney, Agent, or Firm* — Anova Law Group, PLLC (57) ABSTRACT

An electronic device includes an input assembly and an output assembly, to be respectively used for data input and data output, a support assembly, to at least support the input assembly or the output assembly and to enable either of the input assembly or the output assembly to stand on a base, and a connector mechanism, to connect the input assembly and/or the output assembly to the support assembly, and to enable the input assembly and/or the output assembly to rotate relative the support assembly in various dimensions. The electronic device according to embodiments of the present disclosure is rotatable in multiple dimensions to meet user's needs in variable position adjustments.

11 Claims, 8 Drawing Sheets

20

(56) References Cited

U.S. PATENT DOCUMENTS

| | | | |
|---|---|---|---|
| 8,089,750 B2* | 1/2012 | Chen | G06F 1/1681 361/679.26 |
| 8,103,322 B2* | 1/2012 | Burbidge | H04M 1/0247 455/575.4 |
| 8,462,103 B1* | 6/2013 | Moscovitch | G06F 1/1601 345/156 |
| 8,654,518 B2* | 2/2014 | Wei | G06F 1/162 361/679.02 |
| 8,861,187 B2* | 10/2014 | Takahashi | G06F 1/162 361/679.06 |
| 9,474,021 B2 | 10/2016 | Reeves et al. | |
| 10,057,998 B1* | 8/2018 | Jiang | H05K 1/028 |
| 10,990,125 B1* | 4/2021 | Tsai | G06F 1/1681 |
| 2004/0121826 A1* | 6/2004 | Ma | H04M 1/0227 455/575.4 |
| 2005/0237701 A1* | 10/2005 | Yu | G06F 1/1622 361/679.27 |
| 2006/0077621 A1* | 4/2006 | Adatia | G06F 1/1624 361/679.06 |
| 2009/0298546 A1* | 12/2009 | Kim | G06F 1/1686 455/566 |
| 2010/0129782 A1* | 5/2010 | Milne | G06F 15/0283 434/317 |
| 2010/0232102 A1* | 9/2010 | Walker | G06F 1/1622 361/679.27 |
| 2010/0321275 A1* | 12/2010 | Hinckley | G06F 1/1654 345/1.3 |
| 2012/0250283 A1* | 10/2012 | Travis | G06F 1/1622 361/807 |
| 2012/0274540 A1 | 11/2012 | Inami et al. | |
| 2013/0044409 A1* | 2/2013 | Pegg | G06F 1/1622 361/679.01 |
| 2013/0180934 A1* | 7/2013 | Hsu | G06F 1/1654 211/26 |
| 2015/0037085 A1* | 2/2015 | Carnevali | F16M 11/24 403/103 |
| 2015/0055291 A1* | 2/2015 | Chuang | G06F 1/1622 361/679.55 |
| 2015/0124385 A1* | 5/2015 | Mak | F16M 13/04 361/679.03 |
| 2017/0308125 A1 | 10/2017 | Chun et al. | |
| 2017/0339800 A1* | 11/2017 | Burns | G06F 1/1622 |
| 2019/0182972 A1 | 6/2019 | Rohrbach | |
| 2020/0128687 A1* | 4/2020 | Ku | H05K 5/0226 |
| 2020/0285276 A1* | 9/2020 | Lin | G06F 1/1622 |

FOREIGN PATENT DOCUMENTS

| | | |
|---|---|---|
| CN | 1940809 A | 4/2007 |
| CN | 101561698 A | 10/2009 |
| CN | 101637071 A | 1/2010 |
| CN | 102736689 A | 10/2012 |
| CN | 103249268 A | 8/2013 |
| CN | 204141169 U | 2/2015 |
| CN | 105493002 A | 4/2016 |
| CN | 205350757 U | 6/2016 |
| CN | 106200782 A | 12/2016 |
| CN | 106371509 A | 2/2017 |
| CN | 207924700 U | 9/2018 |
| CN | 208569460 U | 3/2019 |
| WO | 2008117463 A1 | 10/2008 |

\* cited by examiner

DATA PROCESSING METHOD, DEVICE, AND ELECTRONIC APPARATUS

CROSS-REFERENCE TO RELATED APPLICATION

This application claims priority to Chinese patent application CN201910701492.X, filed on Jul. 31, 2019, the entire content of which is incorporated herein by reference.

TECHNICAL FIELD

The present disclosure relates to the technical field of an electronic device, particularly an electronic device.

BACKGROUND

There are more and more multi-tasking operations when using computers. People often need to use multiple screens or even multiple electronic devices for collaborative use, thereby improving work efficiency. At present, notebook computers can already facilitate dual-screen display applications with the support of graphics cards. However, in these existing dual-screen designs, the second screen is often a detachable screen, which is not portable and does not support displays through large angular rotations and turns. It can be seen that at least some of the above-mentioned existing dual-screen notebook computers are not user friendly and present defects in their structure and use. Further improvement is needed.

SUMMARY

In view of the above-mentioned problems in the prior technology, embodiments of the present application provide an electronic device with a multi-dimensional rotation function that can meet the needs of users in using the electronic device in various directions.

To solve the above-mentioned problems, a technical solution according to the present disclosure provides an electronic device, including an input assembly and/or an output assembly, to be respectively used for data input and/or data output, a support assembly, to at least support the input assembly or the output assembly and to enable either of the input assembly or the output assembly to stand on a base, and a connector mechanism, to connect the input assembly and/or the output assembly to the support assembly, and to enable the input assembly and/or the output assembly to rotate relative the support assembly in various dimensions.

In certain embodiments, the electronic device includes the input assembly and the output assembly, at least the input assembly is also used for data output.

In certain embodiments, the support assembly includes a first support panel and a second support panel, and the connector mechanism at least includes two connector assemblies, one of the two connector assemblies being to connect the input assembly to the first support panel and to enable the input assembly to rotate relative to the first support panel in various dimensions, and another of the two connector assembly being to connect the output assembly to the second support panel and to enable the output assembly to rotate relative to the second support panel in various dimensions.

In certain embodiments, the connector assembly includes a shaft configured on the support assembly, a first connector configured on the shaft and rotatable about the shaft in a first dimension range, and a second connector configured on the input assembly or the output assembly and being in engagement connection to the first connector, and the second connector is rotatable in the first dimension range relative to the first connector, and rotatable in a second dimension range relative to the first connector.

In certain embodiments, a first rotate-connect part is configured on a side of the first connector and is connected to the shaft, a second rotate-connect part is configured on and protrudes out from an opposing side of the first connector, the second rotate-connect part is circular, and an external edge of the second rotate-connect part extends outwardly to form a circle of ridge.

In certain embodiments, a circular through aperture is defined on the second connector, and when the first connector is in engagement connection to the second connector, the second rotate-connect part of the first connector extends into the circular through aperture of the second connector, and the ridge engages an external edge of the circular through aperture.

In certain embodiments, the electronic device further includes a damping structure positioned at a preset location to increase damping between the second rotate-connect part and the second connector.

In certain embodiments, the first connector includes a first stop block positioned on a side of the first connector where the second rotate-connect part is located, a rotation channel is defined on a side of the second connector facing towards the first connector, the second connector rotates along the rotation channel along a second dimension range, the first stop block is received within and moves along the rotation channel, and a second stop block is positioned inside of the rotation channel to engage the first stop block and hence to limit rotation range of the second connector.

In certain embodiments, the first dimension range and the second dimension range at least support the input assembly and the output assembly to rotate to a same plane state via the connector mechanism, such that the support assembly is to support both the input assembly and the output assembly to stand on the base.

In certain embodiments, the first support panel is in rotation connection to the second support panel via a shaft mechanism including a double-rotation-axis shaft.

In certain embodiments, the input assembly and the output assembly each include a touch screen.

In comparison to the existing technologies, the present disclosure is advantageous in that the input assembly and/or the output assembly can not only rotate relative to the support, but also can rotate in multi-dimensional directions, so that the input assembly and/or the output assembly themselves can satisfy the user in multi-directional use requirements for electronic equipment, and when the input assembly and/or output assembly are engaged with the support assembly, the electronic device can stand on a base such as a desktop, to facilitate the user in using the electronic device to watch media files such as video and show images to other users, etc., which increases the user's use range of the electronic device and provides use convenience to the user.

BRIEF DESCRIPTION OF THE DRAWINGS

For a more complete understanding of the embodiments of the present disclosure and associated advantages, reference will now be made to the following description in conjunction with the accompanying drawings.

Numerals in the Drawings: 1—input assembly; 2—output assembly; 3—first support panel; 4—second support panel; 5—shaft; 6—first connector; 7—second connector; 8—first rotate-connect part; 9—second rotate-connect part; 10—ridge; 11—first stop block; 12—rotation channel; 13—second stop block.

DETAILED DESCRIPTION OF THE EMBODIMENTS

It should be understood that various modifications can be made to the embodiments disclosed herein. Therefore, the following description should not be regarded as a limitation, but merely as examples of various embodiments. Those skilled in the art may arrive at other modifications within the scope and spirit of the present disclosure.

The drawings included in the specification and constituting a part of the specification illustrate the embodiments of the present disclosure, and are used to explain the principles of the present disclosure together with the summary of the present disclosure given above and the detailed description of the embodiments given below.

These and other characteristics of the present disclosure will become apparent from the following description of various embodiments given as non-limiting examples with reference to the accompanying drawings.

It should also be understood that although the present disclosure has been described with reference to some specific examples, those skilled in the art can realize other alternative forms of the present disclosure, which have the features described in the claims and are therefore within the scope of protection as defined by the claims.

The above-mentioned and other aspects, features and advantages of the present disclosure will become more apparent in view of the following detailed description and the accompanying drawings.

Hereinafter, specific embodiments of the present disclosure will be described with reference to the accompanying drawings; however, it should be understood that the disclosed embodiments are merely examples of the present disclosure, which can be implemented in various ways. Some of the well-known and/or repeated functions and structures have not been described in detail to avoid unnecessary or redundant details from obscuring the present disclosure. Therefore, the specific structural and functional details disclosed herein are not necessarily intended to be limiting, but merely serve as the claims basis and representative basis to teach those skilled in the art to use the present disclosure in a variety of ways with any substantially suitable detailed structures.

The present disclosure may use the phrases "in one embodiment," "in another embodiment," "in yet another embodiment," or "in other embodiments," which can all refer to one or more same or different embodiments according to the present disclosure.

Embodiments of the present disclosure will be described in detail below with reference to the drawings.

Figure 1:
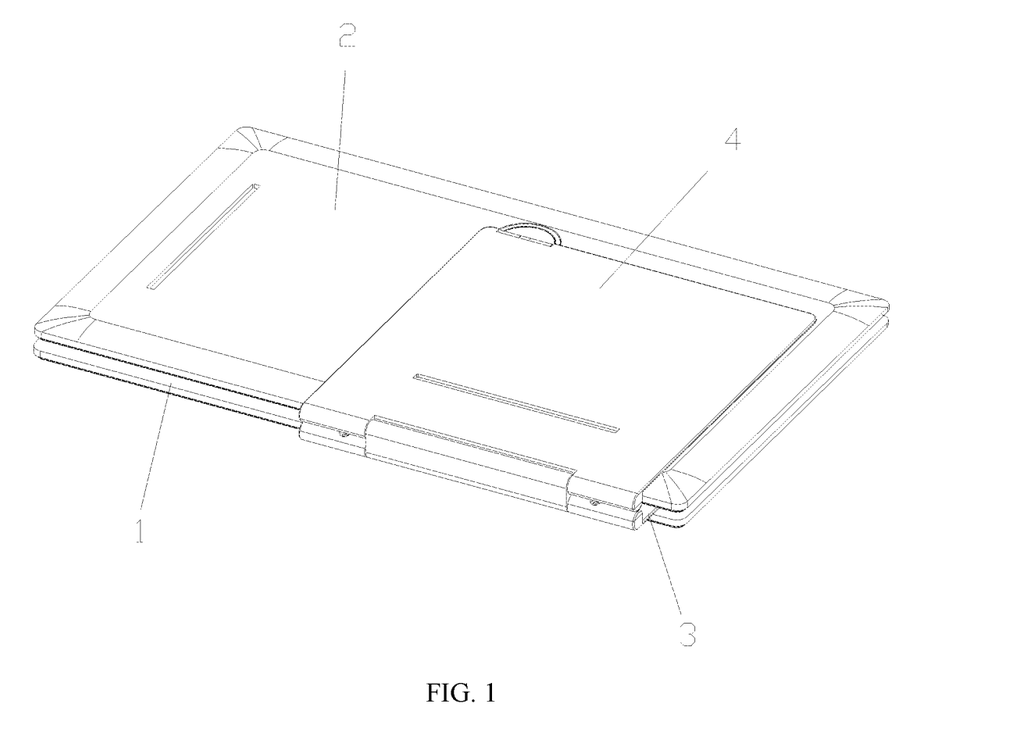
FIG. 1 is a schematic diagram of an electronic device according to embodiment(s) of the present disclosure.
Figure 2:
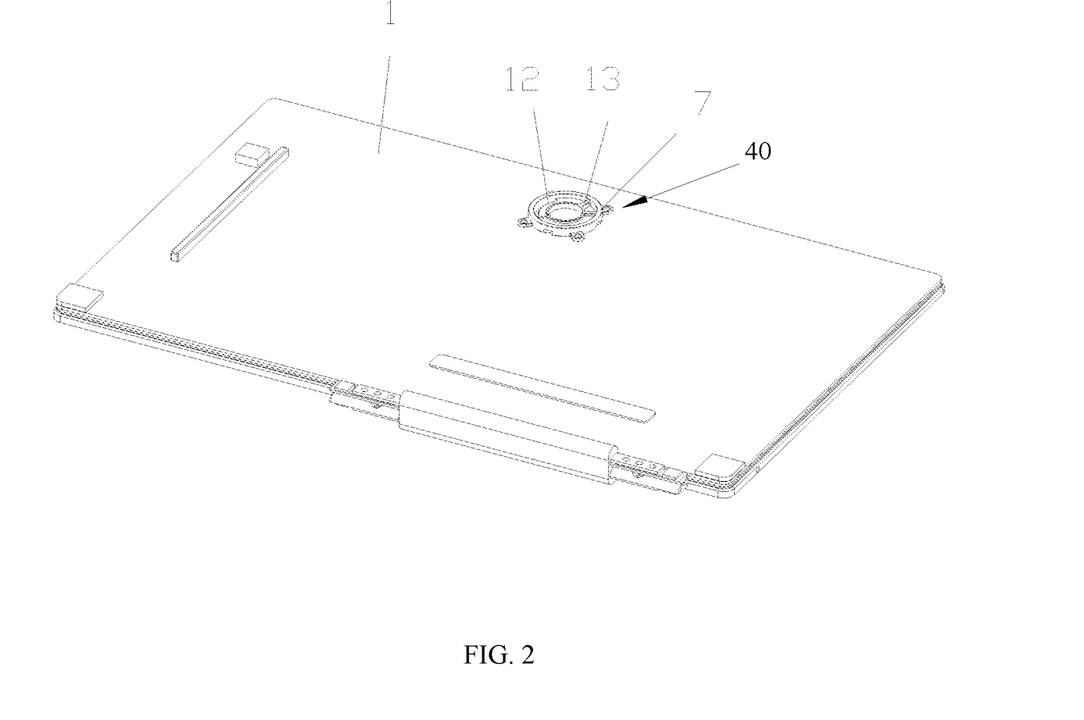
FIG. 2 is a partial schematic diagram of an electronic device according to embodiment(s) of the present disclosure.

As illustratively depicted in FIG. 1 and FIG. 2, embodiments of the present disclosure provide an electronic device, which includes: an input assembly 1 and/or an output assembly, respectively used for data input and/or data output; a support assembly 40 at least used for supporting the input assembly 1 or the output assembly 2 to enable the input assembly 1 or the output assembly 2 to stand on a base; and a connector mechanism, to connect the input assembly 1 and/or the output assembly 2 to the support assembly, and to enable the input assembly 1 and/or the output assembly 2 to rotate relative to the support assembly at various dimensions.

The present disclosure is advantageous in that the input assembly and/or the output assembly can not only rotate relative to the support, but also can rotate in multi-dimensional directions, so that the input assembly and/or the output assembly themselves can satisfy the user in multi-directional use requirements for electronic equipment, and when the input assembly and/or output assembly are engaged with the support assembly, the electronic device can stand on a base, to facilitate the user in using the electronic device to watch media files such as video and show images to other users, etc., which increases the user's use range of the electronic device and provides use convenience to the user.

In particular, the electronic device according to embodiments of the present disclosure includes the input assembly 1 and the output assembly 2, where at least the input assembly 1 may also enable data output. That is to say, the input assembly 1 according to embodiments of the present disclosure may enable not only data input, but also data output. Of course, the output assembly 2 may also be configured to enable data input. In practice, for example, the electronic device may include a display and a keyboard, may also include a regular display and a touch panel, may also be configured, for example according to embodiments of the present disclosure, such that the input assembly 1 and the output assembly 2 are each an element including a touch screen. Specific designs are not limiting, and may vary as needed.

Moreover, and as illustratively depicted in FIG. 1, the support assembly according to embodiments of the present disclosure includes a first support panel 3 and a second support panel 4 in rotational connection to the first support panel 3. The connector mechanism includes at least two connector assemblies, where a first connector assembly is to connect the input assembly 1 to the first support panel 3, and to enable the input assembly 1 to rotate about the first support panel 3 at various dimensions, and where a second connector assembly is to connect the output assembly 2 to the second support panel 4, and to enable the output assembly 2 to rotate about the second support panel 4 at various dimensions.

Figure 9:
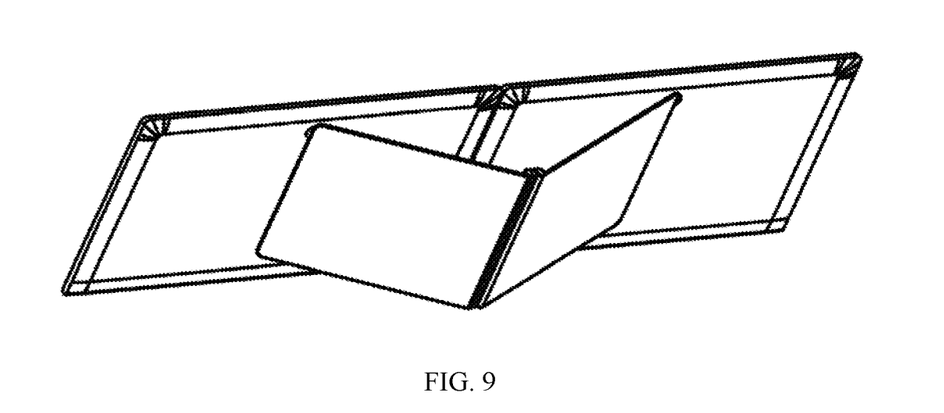
FIG. 9 is a schematic diagram of an electronic device in a second state of use according to embodiments of the present disclosure.
Figure 11:
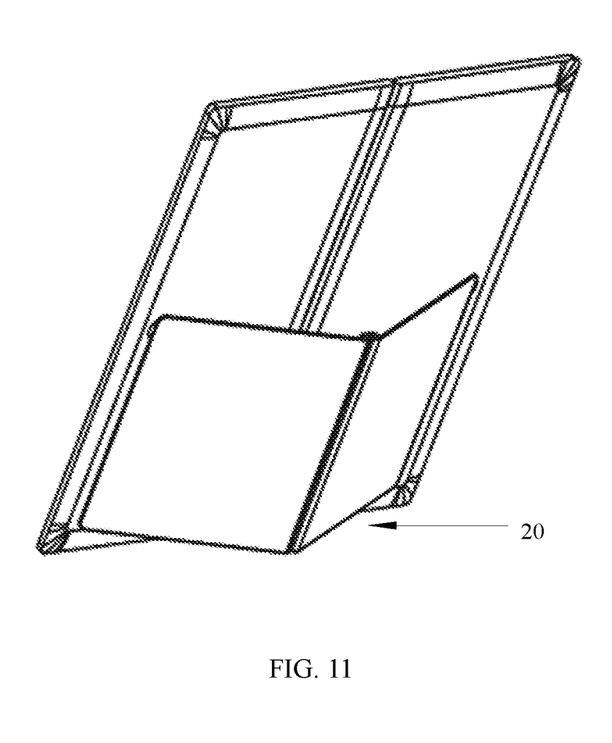
FIG. 11 is a schematic diagram of an electronic device in a fourth state of use according to embodiments of the present disclosure.
Figure 12:
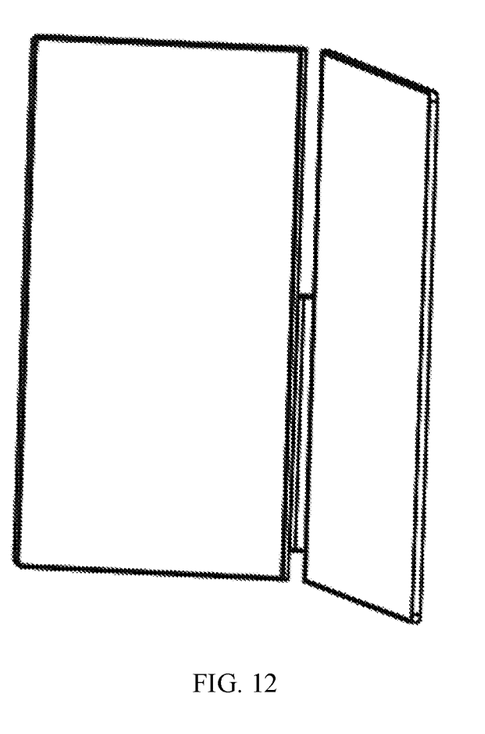
FIG. 12 is a schematic diagram of an electronic device in a fifth state of use according to embodiments of the present disclosure.

In particular, the first support panel and the second support panel according to embodiments of the present disclosure may be connected to each other via a shaft mechanism, where the shaft mechanism includes a double-axis shaft, to increase rotational range of the support assembly, to enable rotation at a range, for example, of 0 to 360 degrees, and to ease support angle adjustment by a user, as illustratively demonstrated in FIG. 9, FIG. 11, and FIG. 12. Of course, the shaft mechanism may include only one shaft, as may be called for under certain circumstances, for example as determined according to sizes of the support panels, the input assembly 1 and the output assembly 2.

Furthermore, and as illustratively depicted in FIG. 3, FIG. 4, FIG. 5, and FIG. 6, the two connector assemblies of the connector mechanism according to embodiments of the present disclosure may be the same, where the two connector assemblies enable the input assembly 1 and the output assembly 2 to be respectively connected to and rotate about the first support panel 3 and the second support panel 4. In particular, the connector assemblies according to embodiments of the present disclosure may each include: a shaft 5 configured on the support assembly; a first connector 6 configured on the shaft 5 and rotatable about the shaft 5 in a first dimension range; and a second connector configured on the input assembly 1 or the output assembly 2 and being in engagement connection to the first connector 6; where the second connector 7 is rotatable relative to the first connector 6 in the first dimension range and is also rotatable relative to the first connector 6 in a second dimension range.

The shaft 5 of the first connector assembly according to embodiments of the present disclosure is mounted on a corresponding support panel, the first connector 6 may rotatably connected to the shaft 6, and its rotation range is within the first dimension range. The second connector 7 is configured on the input assembly 1 or the output assembly 2, where the second connector 7 may realize its rotation in the second dimension range via engagement connection to the first connector, and may rotate in the first dimension range in response to movement of the first connector 6. The input assembly 1 or the output assembly 2 according to embodiments of the present disclosure is connected to corresponding support panel via engagement with the second connector 7 and the first connector 6, to form an integral unit, where after the connection, the input assembly 1 and the output assembly 2 may realize rotations in various dimensions via engagement with the two connectors and the shaft 5, to assist user in position adjustment of the electronic device so as to provide the user with use convenience.

Figure 3:
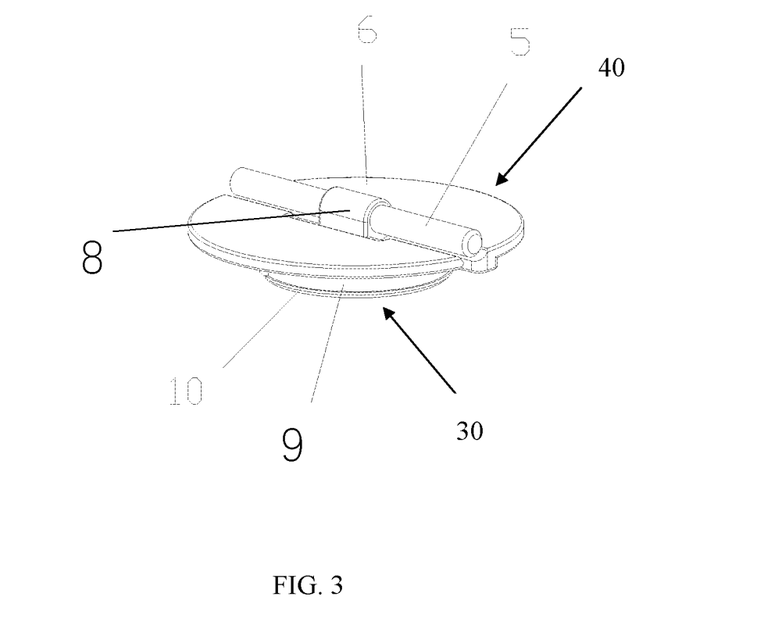
FIG. 3 is a schematic diagram of a first connector according to embodiment(s) of the present disclosure.
Figure 4:
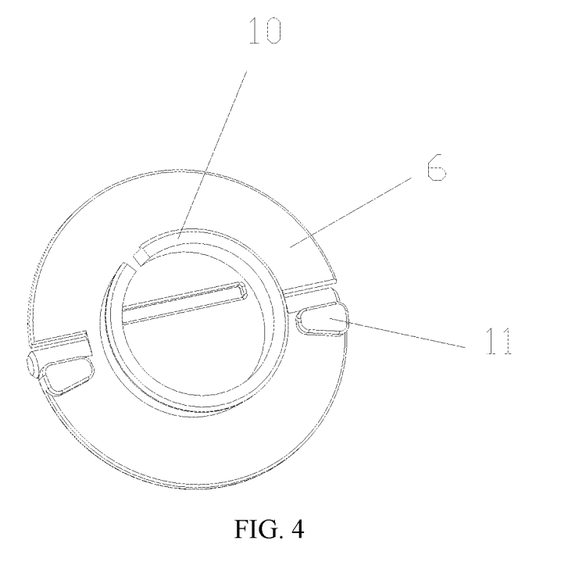
FIG. 4 is another schematic diagram of the first connector according to embodiment(s) of the present disclosure.
Figure 5:
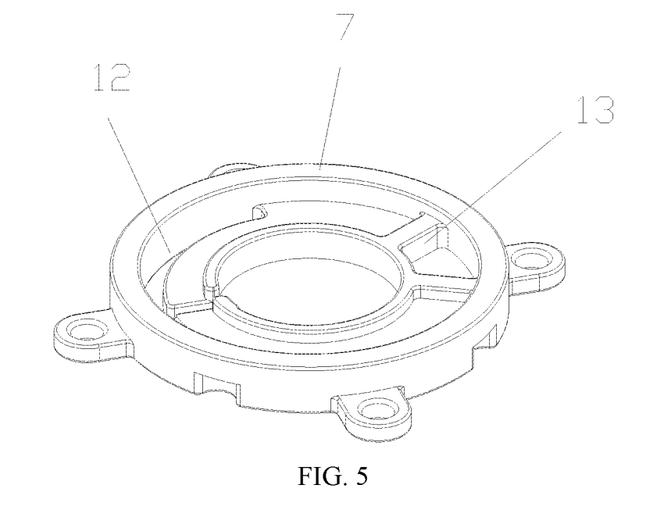
FIG. 5 is a schematic diagram of a second connector according to embodiment(s) of the present disclosure.
Figure 6:
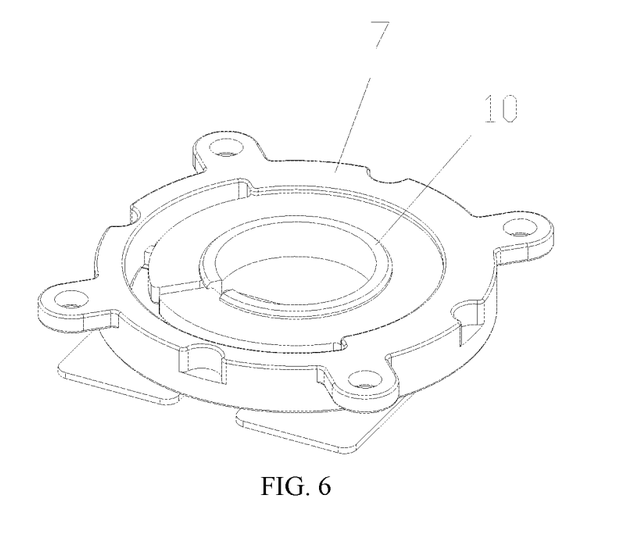
FIG. 6 is a schematic diagram of an electronic device including an engagement between a first connector and a second connector according to embodiment(s) of the present disclosure.

Furthermore, and as illustratively depicted in FIG. 3, FIG. 4, and FIG. 6, configured on a side of the first connector 6 is a first rotate-connect part 8 in engagement with the shaft 5, and configured on and protruding from an opposing side of the first connector 6 is a second rotate-connect part 9, where the second rotate-connect part 9 may be circular, and an external side of the second rotate-connect part 9 extends out to form a circle of ridge or protrusion 10.

In particular, the first connector according to embodiments of the present disclosure may be circular, the first rotate-connect part 8 is configured on the side of the first connector 6 and is in rotational engagement with the shaft 5, where the structure of the first rotate-connect part 8 is not limited, and may be for example a set of connecting panels configured on the shaft 5. The second rotate-connect part 9 is configured on a middle portion of the opposing side of the first connector 6, and, for example, extends outwardly along an axis of an inner circle to form a tubular ring, and the ridge 10 forms on an external end of the second rotate-connect part 9 where the external end extends from the second rotate-connect part 9 along the axis, in the structure shown in the drawings.

A circular through aperture is defined in the second connector 7 according to embodiments of the present disclosure, such that when the first connector is in engagement connection to the second connector 7, the second rotate-connect part 9 of the first connector 6 extends into the circular through aperture, and the ridge 10 engages an edge of the circular through aperture.

Figure 7:
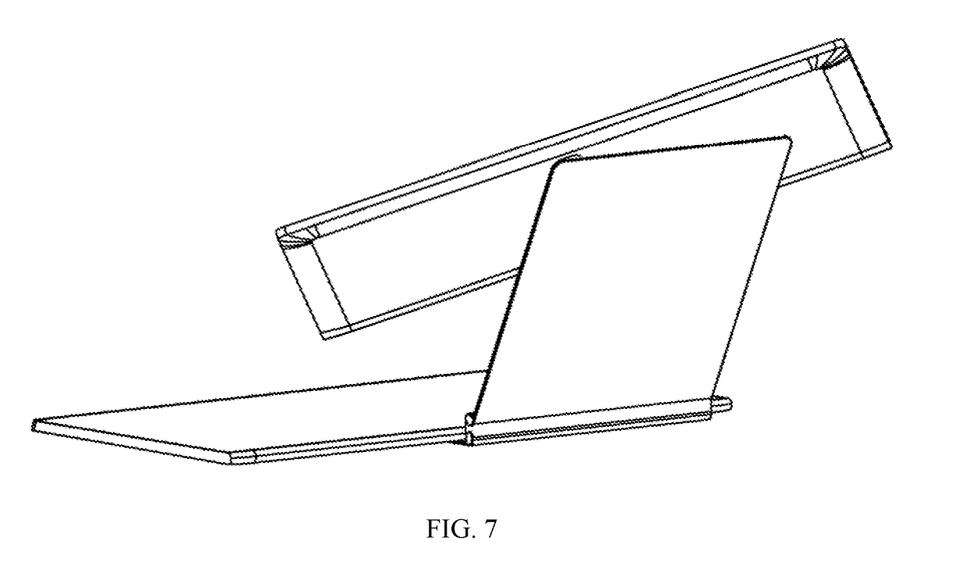
FIG. 7 is a schematic diagram of an electronic device in a state of rotation according to embodiments of the present disclosure.

For example, the second connector 7 is also circular and a circular inner hole is defined thereupon, where when the first connector 6 is to be engaged with the second connector 7, the second rotate-connect part 9 of the first connector 6 extends into the inner hole of the second connector 7, and the connection is realized via an engagement between the ridge 10 of the second rotate-connect part 9 and an external edge of the inner hole. After the first connector 6 is engaged with the second connector 7, the input assembly 1 or the output assembly 2 may rotate about the shaft 5 in a page-turning like motion via engagement between the first connector 6 and the shaft 5, that is, to rotate in the first dimension range, and to further rotate about the second rotate-connect part via engagement between the first connector 6 and the second connector 7, as illustratively depicted in FIG. 7, that is, the input assembly 1 or the output assembly 2 may rotate relative to their corresponding support panel to realize rotation in the second dimension range.

In practice, smooth connection between the second rotate-connect part 9 and the second connector 7 may be realized via size matching and material preparation between the two, and may also be realized via structure variation between the two. For example, a notch may be defined on the second rotate-connect part 9 along an axis, and the notch may be positioned on or near the ridge 10, or may extend along an entirety of the second rotate-connect part 9. Alternatively, a notch may be defined on the circular through aperture of the second connector 7, or the two above-mentioned notches may be both present, such that the second rotate-connect part 9 and/or the circular through aperture of the second connector 7 are provided with certain resilience. In this way, smooth engagement between the two connectors may be readily realized, damping coefficient between the two may be increased, and extent of engagement between the two may thus be elevated.

Furthermore, for the input assembly 1 and the output assembly 2 to deliver position-limiting or position-stopping effect at a preset location, that is to be at least temporarily locked at the preset location, a damping structure 30 may be positioned between the second rotate-connect part 9 and the second connector 7 to increase damping between the two at least at the preset location. The damping structure is not limited, and may be, for example, configured to be of a concave-convex engagement structure, or may be, as mentioned herein above, designed to have a notch, and concurrently to increase the size of the second rotate-connect part 9 to some extent, and/or to proportionally reduce the size of the circular through aperture of the second connector 7, so as to realize an overall increase in damping. The preset location mentioned above is relevant to the second dimension range, and the present location may also be relevant in the first dimension range, that is the input assembly 1 and the output assembly 2 may stop or freeze at a certain location during the page-turning motion, while the damping structure is not limited to any particular structure, and may be of any structure mentioned herein above.

Furthermore, and as illustratively depicted in FIG. 3, FIG. 4, FIG. 5, and FIG. 6, the input assembly 1 and the output assembly 2 may be limited in their rotational angle. In certain embodiments, the first stop block 11 may be positioned on a side of the second rotate-connect part 9 of the first connector 6, a rotation channel 12 is defined on a side of the second connector 7 facing the first connector 6, where the second connector 7 rotates along the rotation channel in the second dimension range, where the first stop block 11 is received inside of and moves along the rotation channel 12, and where a second stop block 13 is positioned inside of the rotation channel 12 to engage the first stop block and hence to limit the rotation range of the second connector 7. That is, after the first connector 6 becomes engaged with the second connector 7, the first stop block 11 is received within the rotation channel 12, moves inside of the rotation channel along with the rotation of the input assembly 1 or the output assembly 2, and becomes engaged with the second stop block upon arriving at the preset location, so as to limit the forward movement of the first stop block 11, that is, to limit the rotation of the input assembly 1 or the output assembly 2 in this direction. The first stop block 11 and the second stop block 13 are not limited in their assignment locations, and their locations may be varied according to a preset rotational range allocated to the input assembly 1 or the output assembly 2 during an actual use.

Furthermore, it can be obtained from various use statuses of the electronic device illustratively depicted in FIG. 8 through FIG. 13, when using the electronic device according to embodiments of the present disclosure, the user may rotate the input assembly 1 and/or output assembly 2 within the first dimension range or the second dimension range. The first dimension range and the second dimension range according to embodiments of the present disclosure may enable the input assembly 1 and the output assembly 2 to rotate to a shared or same plane position via the connector mechanism, therefore, when the input assembly 1 and the output assembly 2 are each a touch screen, the two screens may be integrated at the shared plane position to form an integrated screen, and may stand on a desktop with the support of the support assembly 20, to be utilized by the user. Alternatively, the user may flip and fold the device to form an electronic device with a front-and-back double-sided screen, and alternatively also, the user may rotate the device to be a regular notebook computer for use. Ways of rotations are not limited, and may vary according to the user's actual use.

Figure 8:
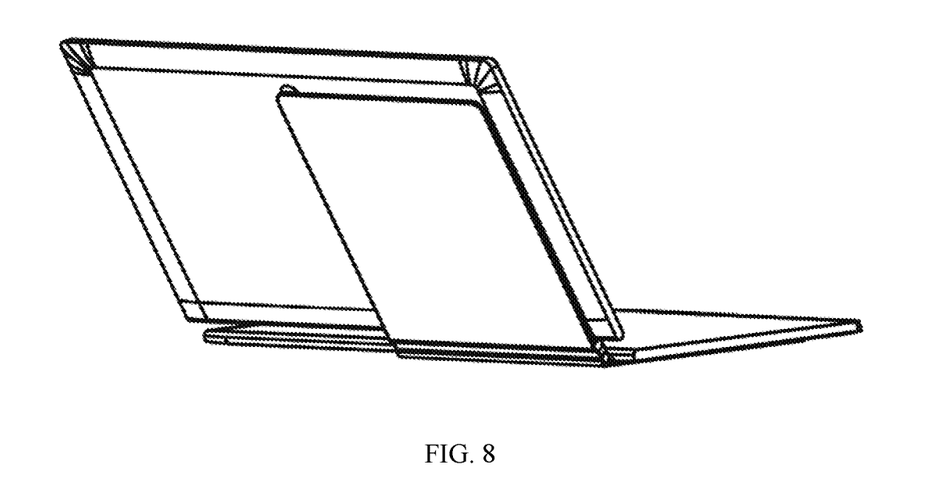
FIG. 8 is a schematic diagram of an electronic device in a first state of use according to embodiments of the present disclosure.

In particular, for example, and as illustratively depicted in FIG. 8, the electronic device under this mode/state may operate as a regular notebook computer, using the input assembly 1 as the touch screen or the keyboard, and using the output assembly 2 as the display.

The electronic device shown in FIG. 9 is in a use state of a dual-screen mode/state, where the input assembly 1 and the output assembly 2 are both of display function, an engagement of both assemblies collectively forms an enlarged display, while also being able to stand on the desktop via the support assembly for viewing use by the user. In addition, and under this mode/state, the input assembly 1 may be connected to an external keyboard, where the external keyboard may connect via, for example, Bluetooth and WiFi, etc., or may exist in a mode of projection. Mode of existence is not limited, as long as input data by the user may be collected.

Figure 10:
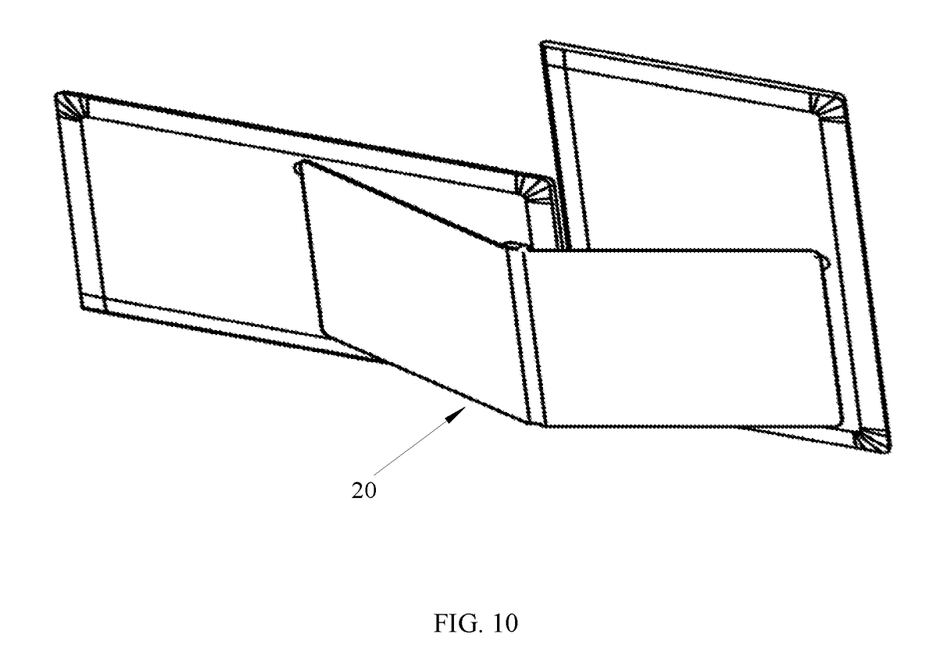
FIG. 10 is a schematic diagram of an electronic device in a third state of use according to embodiments of the present disclosure.

The electronic device as shown in FIG. 10 may also be considered in a state of dual-screen mode/state, where under this mode/state, the output assembly 2 is configured in a vertical direction, the input assembly 1 is configured in a horizontal direction, both stand on the desktop via the support assembly, where the output assembly 2 is to display data, while the input assembly 1 is to collect user input data via functioning as a keyboard or as an electromagnetic screen which supports handwriting. Of course, the input assembly 1 and the output assembly 2 are not limited in their configuration directions, and may reverse in directions, and specific configurations may vary dependent upon the user's use preferences. Alternatively, and under this mode/state, the input assembly 1 and the output assembly 2 may both function as a display, displaying different contents, or same contents, and/or displaying in different status, for example, one assembly displays a file while the other assembly displays in zoom-in a portion of the file the user is currently viewing.

The electronic device shown in FIG. 11 is in a use state of reading mode/state, and under this mode/state, the input assembly 1 and the output assembly 2 are both to display, the two collectively form a big screen, to stand on the desktop via the support assembly, where the user may read files using the electronic device under this mode/state, or to display images or to watch movies via the use of the electronic device.

The electronic device shown in FIG. 12 is also in a use state of reading mode/state, and may be considered an alternative to the mode/state shown in FIG. 11, where under this mode/state, the input assembly 1 and the output assembly 2 are both used to display. Different than the mode/state of the electronic device shown in FIG. 11, the input assembly 1 and the output assembly 2 while both stand on the desktop, do not need to exist on a same plane, and rather exist in different planes in a way more like book pages where each assembly may be used to display contents from different book pages.

Figure 13:
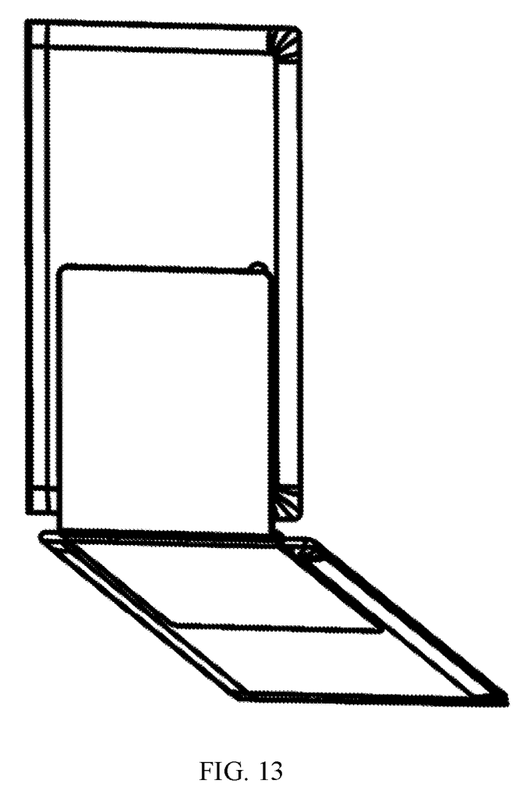
FIG. 13 is a schematic diagram of an electronic device in a sixth state of use according to embodiments of the present disclosure.

The electronic device shown in FIG. 13 is in a use state, for example, of a sticky note mode, where when the electronic device is used a mobile phone, the user may rotate the device to the state as shown, to have the input assembly 1 be held in the user's hand, where the user may operate the input assembly 1, such as to make sticky notes, according to what is displayed on the output assembly 2, therefore the mode/state may be defined as a sticky note mode/state.

The above-described embodiments are only exemplary of the present disclosure, are not used to limit the present disclosure, and the protection scope of the present disclosure is defined by the claims. Those skilled in the art can make various modifications or equivalent substitutions to the present disclosure within the essence and protection scope of the present disclosure, and such modifications or equivalent substitutions shall also be deemed to fall within the protection scope of the present disclosure.

What is claimed is:

1. An electronic device, comprising:
an input assembly and an output assembly, to be respectively used for data input and data output, each of the input assembly and the output assembly including a touch screen;
a support assembly including a first support panel and a second support panel in rotatable connection to the first support panel, to support the input assembly and the output assembly and to enable both the input assembly and the output assembly to stand on a base with a non-zero angle relative to the base; and
a connector mechanism, to connect the input assembly and the output assembly to the support assembly, and to enable the input assembly and the output assembly to rotate relative the support assembly in various dimensions, the connector mechanism including two connector assemblies, one of the two connector assemblies being to connect the input assembly to the first support panel and to enable the input assembly to rotate relative to the first support panel in various dimensions, and another of the two connector assemblies being to connect the output assembly to the second support panel and to enable the output assembly to rotate relative to the second support panel in various dimensions.

2. The electronic device of claim 1, wherein each of the two connector assemblies includes
a shaft configured on the support assembly,
a first connector configured on the shaft and rotatable about the shaft in a first dimension range, and
a second connector configured on the input assembly or the output assembly and being in engagement connection to the first connector, and wherein
the second connector is rotatable in the first dimension range relative to the first connector, and rotatable in a second dimension range relative to the first connector.

3. The electronic device of claim 2, wherein a first rotate-connect part is configured on a side of the first connector and is connected to the shaft, a second rotate-connect part is configured on and protrudes out from an opposing side of the first connector, the second rotate-connect part is circular, and an external edge of the second rotate-connect part extends outwardly to form a circle of ridge.

4. The electronic device of claim 3, further comprising a damping structure positioned at a preset location to increase damping between the second rotate-connect part and the second connector.

5. The electronic device of claim 3, wherein the first connector includes a first stop block positioned on a side of the first connector where the second rotate-connect part is located, a rotation channel is defined on a side of the second connector facing towards the first connector, the second connector rotates along the rotation channel along the second dimension range, the first stop block is received within and moves along the rotation channel, and a second stop block is positioned inside of the rotation channel to engage the first stop block and hence to limit rotation range of the second connector.

6. The electronic device of claim 2, wherein a circular through aperture is defined on the second connector, and when the first connector is in engagement connection to the second connector, the second rotate-connect part of the first connector extends into the circular through aperture of the second connector, and the ridge engages an external edge of the circular through aperture.

7. The electronic device of claim 2, where the first dimension range and the second dimension range support the input assembly and the output assembly to rotate to a same plane state via the connector mechanism, such that the support assembly is to support both the input assembly and the output assembly to stand on the base.

8. An electronic device, comprising:
a first electronic screen and a second electronic screen;
a first support panel to support the first electronic screen and to enable the first electronic screen to stand on a base with a non-zero angle relative to the base, and a second support panel to support the second electronic screen and to enable the second electronic screen to stand on the base with the non-zero angle relative to the base, the first support panel being in rotatable connection to the second support panel; and
a connector mechanism to enable a rotational engagement between the first electronic screen and the first support panel, wherein the connector mechanism includes a first connector and a second connector to connect the first electronic screen and the first support panel, and wherein the first connector includes a first stop block, the second connector defines a rotation channel, and the first stop block is at least partially received inside of the rotation channel when the first electronic screen and the first support panel are in the rotational engagement.

9. The electronic device of claim 8, wherein the connector mechanism further includes:
a first rotate-connect part supported on the first connector; and
a shaft to be partially received through the first rotate-connect part to enable a rotational engagement of the shaft relative to the first connector such that the first connector is connected to the one of the first electronic screen and the first support panel via the shaft.

10. The electronic device of claim 9, wherein the connector mechanism further includes a second rotate-connect part, the second connector defines a through aperture, and the ridge is at least partially received inside of the through aperture when the first electronic screen and the first support panel are in the rotational engagement.

11. The electronic device of claim 8, wherein the connector mechanism further includes a second stop block to be positioned inside of the rotation channel to engage the first stop block and hence to limit rotation range of the second connector.

* * * * *